US009728230B2

(12) United States Patent
Cudak et al.

(10) Patent No.: US 9,728,230 B2
(45) Date of Patent: Aug. 8, 2017

(54) TECHNIQUES TO BIAS VIDEO THUMBNAIL SELECTION USING FREQUENTLY VIEWED SEGMENTS

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 14/185,151

(22) Filed: Feb. 20, 2014

(65) Prior Publication Data
US 2015/0235672 A1 Aug. 20, 2015

(51) Int. Cl.
*H04N 9/80* (2006.01)
*G11B 27/30* (2006.01)
(Continued)

(52) U.S. Cl.
CPC ........ *G11B 27/3081* (2013.01); *G11B 27/105* (2013.01); *G11B 27/309* (2013.01);
(Continued)

(58) Field of Classification Search
CPC ... G11B 27/309; G11B 27/3081; G11B 27/34; G11B 27/105; G06F 17/30843; H04N 21/44222; H04N 21/252; H04N 21/25891; H04N 21/4826; H04N 21/8153; H04N 21/8456; H04N 21/4312
(Continued)

(56) References Cited

U.S. PATENT DOCUMENTS

| | | | | |
|---|---|---|---|---|
| 5,537,530 A | * | 7/1996 | Edgar | G06F 17/30843 375/E7.183 |
| 5,574,845 A | * | 11/1996 | Benson | G06F 17/30852 345/418 |

(Continued)

FOREIGN PATENT DOCUMENTS

WO WO2013056311 A1 4/2013

OTHER PUBLICATIONS

Uchida et al., "Fast and robust content-based copy detection based on quadrant of luminance centroid and adaptive feature comparison," Proceedings of 2010 IEEE 17th International Conference on Image Processing (Sep. 2010).
(Continued)

*Primary Examiner* — David Harvey
(74) *Attorney, Agent, or Firm* — Kurt P. Goudy; Michael J. Chang, LLC (57) ABSTRACT

Techniques for intelligently biasing video thumbnail selection to popular segments of the video file are provided. In one aspect, a method of selecting video thumbnails used to represent a video file is provided. The method includes the steps of: (a) acquiring trending data from viewers related to the video file; (b) using the trending data to identify one or more segments of the video file that are popular among the viewers; and (c) adapting a selection of the video thumbnails used to represent the video file to the segments identified in step (b).

20 Claims, 3 Drawing Sheets

(51) Int. Cl.
| | | |
|---|---|---|
| *G11B 27/34* | (2006.01) | |
| *G11B 27/10* | (2006.01) | |
| *H04N 21/25* | (2011.01) | |
| *H04N 21/258* | (2011.01) | |
| *H04N 21/482* | (2011.01) | |
| *H04N 21/81* | (2011.01) | |
| *H04N 21/845* | (2011.01) | |
| *H04N 21/431* | (2011.01) | |

(52) U.S. Cl.
CPC ............ *G11B 27/34* (2013.01); *H04N 21/252* (2013.01); *H04N 21/25891* (2013.01); *H04N 21/4312* (2013.01); *H04N 21/4826* (2013.01); *H04N 21/8153* (2013.01); *H04N 21/8456* (2013.01)

(58) Field of Classification Search
USPC ........................................................ 386/241
See application file for complete search history.

(56) References Cited

U.S. PATENT DOCUMENTS

| | | | | | |
|---|---|---|---|---|---|
| 5,884,056 | A * | 3/1999 | Steele | ............... | G06F 17/30843 348/E5.067 |
| 6,144,375 | A * | 11/2000 | Jain | ................... | G06F 17/30017 345/420 |
| 6,340,971 | B1 * | 1/2002 | Janse | ................... | G11B 27/107 348/E5.097 |
| 6,557,042 | B1 * | 4/2003 | He | ..................... | G06F 17/30017 707/999.001 |
| 6,782,049 | B1 * | 8/2004 | Dufaux | ............. | G06F 17/30802 348/700 |
| 7,082,255 | B1 * | 7/2006 | Jun | ..................... | G06F 17/30793 348/E7.071 |
| 7,277,859 | B2 * | 10/2007 | Watanabe | ............. | H04H 60/07 348/E7.07 |
| 7,293,280 | B1 * | 11/2007 | Gupta | ................... | G06F 17/241 348/E7.071 |
| 7,401,351 | B2 * | 7/2008 | Boreczky | ........... | H04N 7/17336 348/E7.073 |
| 8,189,994 | B2 * | 5/2012 | Inatomi | ................ | G11B 27/005 386/248 |
| 8,307,395 | B2 | 11/2012 | Issa et al. | | |
| 8,566,315 | B1 * | 10/2013 | Davtchev | .......... | G06F 17/30817 707/736 |
| 8,972,597 | B2 * | 3/2015 | Van Gassel | ............ | G06Q 30/02 709/231 |
| 8,990,861 | B2 * | 3/2015 | Nishikawa | ........ | G06F 17/30849 725/43 |
| 2002/0083459 | A1 * | 6/2002 | Kondo | .............. | G06F 17/30017 725/88 |
| 2003/0120495 | A1 * | 6/2003 | Watanabe | .............. | H04H 60/07 704/278 |
| 2003/0187919 | A1 * | 10/2003 | Nakamura | ........ | G06F 17/30828 709/203 |
| 2003/0212993 | A1 | 11/2003 | Obrador | | |
| 2005/0114539 | A1 * | 5/2005 | Yoon | ....................... | H04H 60/33 709/231 |
| 2005/0132401 | A1 * | 6/2005 | Boccon-Gibod | .... | G11B 27/002 725/34 |
| 2007/0074244 | A1 * | 3/2007 | Miyamori | ......... | G06F 17/30843 725/34 |
| 2007/0154190 | A1 * | 7/2007 | Gilley | ............... | G06F 17/30796 386/241 |
| 2008/0036917 | A1 * | 2/2008 | Pascarella | ............... | G11B 27/11 348/702 |
| 2008/0313214 | A1 * | 12/2008 | Duhig | ............... | G06F 17/30038 |
| 2009/0199251 | A1 * | 8/2009 | Badoiu | ............. | G06F 17/30867 725/105 |
| 2011/0047163 | A1 * | 2/2011 | Chechik | ............ | G06F 17/30781 707/741 |
| 2011/0107369 | A1 * | 5/2011 | O'Brien | ............ | G06F 17/30029 725/38 |
| 2011/0145428 | A1 * | 6/2011 | Wei | ........................ | G06F 3/0481 709/231 |
| 2011/0145726 | A1 * | 6/2011 | Wei | .................... | G06F 17/30796 715/752 |
| 2011/0270950 | A1 * | 11/2011 | Davis | ..................... | G06Q 30/02 709/217 |
| 2012/0005628 | A1 * | 1/2012 | Isozu | ................... | G06F 3/04842 715/838 |
| 2014/0033036 | A1 * | 1/2014 | Gaur | ................ | H04N 21/4532 715/719 |
| 2014/0059468 | A1 * | 2/2014 | Allgair | ................ | G06F 3/04842 715/771 |
| 2014/0068433 | A1 * | 3/2014 | Chitturi | ............ | H04N 21/41407 715/716 |
| 2014/0149865 | A1 * | 5/2014 | Tanaka | .................. | G06F 3/0484 715/719 |
| 2014/0201126 | A1 * | 7/2014 | Zadeh | .................... | G06K 9/627 706/52 |

OTHER PUBLICATIONS

IBM et al., "Automatic Selection of Representative Keyframes from Video Sequences Using Scene Content," IPCOM000123529D (Apr. 4, 2005).

Boisson et al., "Extraction of side information by motion analysis and interpolation of the nodes of the motion grid for distributed video coding," IPCOM000168611D (Mar. 18, 2008).

\* cited by examiner

FIG. 1

| Video File | Start | End | Group |
|---|---|---|---|
| file001 | 0:15 | 0:22 | a |
| file001 | 1:12 | 1:44 | b |
| file002 | 1:47 | 1:02 | a |
| file003 | 1:20 | 1:40 | a |

TECHNIQUES TO BIAS VIDEO THUMBNAIL SELECTION USING FREQUENTLY VIEWED SEGMENTS

FIELD OF THE INVENTION

The present invention relates to video thumbnail representation of a video file, and more particularly, to techniques for intelligently biasing video thumbnail selection to popular segments of the video file.

BACKGROUND OF THE INVENTION

Video thumbnails are used to quickly represent content in a video file by mousing over a media file. These video thumbnails can greatly increase the probability of user activation of a particular media file as well as user interest, potentially keeping a user at a site longer.

Content providers, such as YouTube, auto-generate a set of video thumbnails for any uploaded video. Different sites linking to video files such as those hosted on YouTube, typically present users with this default set of auto-generated thumbnails. The default thumbnails, however, are oftentimes not optimal for a given audience and/or for the content of the video, and thus have a limited usefulness in piquing viewer interest.

Therefore, techniques for guiding video thumbnail selection based on more user-specific preferences, and thereby increasing user traffic for specific content would be desirable.

SUMMARY OF THE INVENTION

The present invention provides techniques for intelligently biasing video thumbnail selection to popular segments of the video file. In one aspect of the invention, a method of selecting video thumbnails used to represent a video file is provided. The method includes the steps of: (a) acquiring trending data from viewers related to the video file; (b) using the trending data to identify one or more segments of the video file that are popular among the viewers; and (c) adapting a selection of the video thumbnails used to represent the video file to the segments identified in step (b).

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for intelligent selection of thumbnails to represent a video file (i.e., video thumbnails), with a goal being to increase viewers' interest in the content. As will be described in detail below, the present process can be based on a selection of the most frequently viewed portions or segments of the media file, and adapting and/or limiting the thumbnails to those selected portions. Accordingly, users will then be presented with video thumbnails of the segments of the media file that were viewed the most, and thus most popular, among the viewer community. Additional factors may be used to further fine-tune the selection process, such as an indication of what portions of the media file other users (or groups of users) found to be interesting.

Figure 1:
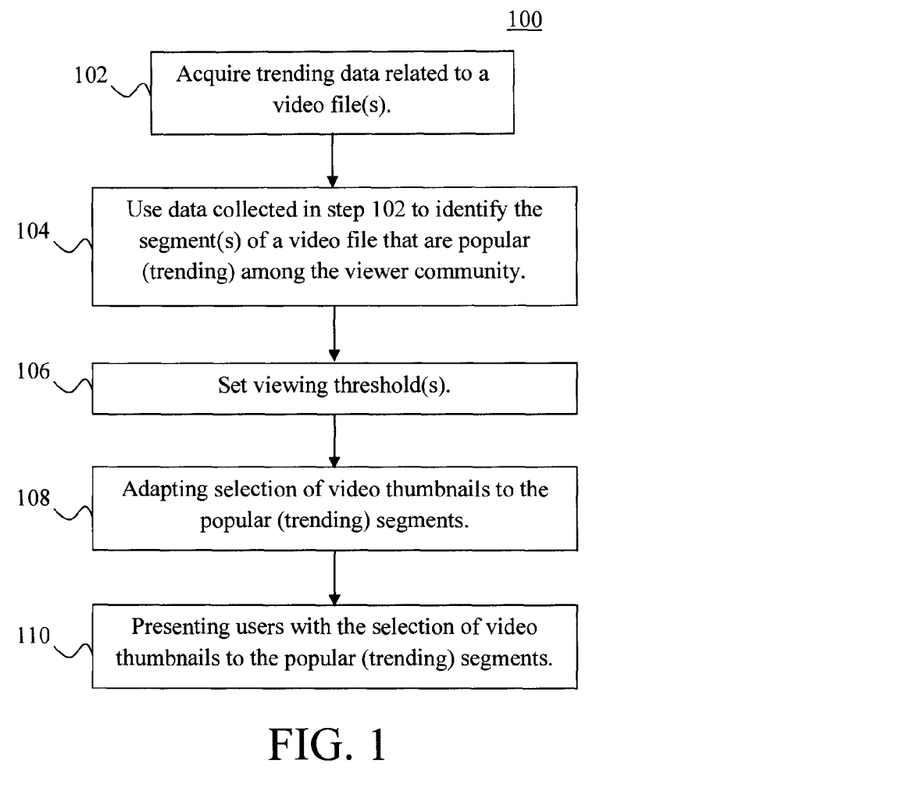
FIG. 1 is a diagram illustrating an exemplary methodology for selecting video thumbnails to represent a video file according to an embodiment of the present invention.

The present techniques for selecting video thumbnails to represent a video file are now described in detail by way of reference to methodology 100 of FIG. 1. The overall goals of methodology 100 are to first identify which portions or segments of the video file are most frequently viewed by the community, and then to configure the video thumbnails used to represent the video file to those most frequently viewed segments. By way of example only, an indicator of what segments of the video file are 'most frequently viewed' can simply be the segment(s) of the video file that are viewed more than a threshold number of times within a given time period. As will be described in detail below, it may be desirable to set different viewing thresholds based on the content, the viewing community (e.g., to accommodate for the viewing preferences of different groups of users), etc.

The objective is to be able to ascertain what portions of the video file are popular. A term of art in social media for popularity is "trending." By way of example only, the present techniques seek to determine what segments of a video file are trending for a viewer community. As further described herein, the term 'community' can refer generally to all viewers of the video file. For instance, the viewer community can be all of the viewers that watch a particular video (or portions thereof) that is posted on YouTube.

Additionally, the viewer community can be further delineated based on the categories or groupings present in social media. For instance, online content viewers can belong to different social groups based, for example, on social media affiliations, similarities in profiles, etc. To use a simple example, one group of users may be those that visit a music video site and another group of users might be those that visit a home improvement site. If for instance, the video file in question is a music video, and using the above threshold concept, it might be desirable to assign a different threshold to those users who visit music video related sites as compared to users visiting non-music video related sites—the notion being that the frequency of views of a particular music video on these two types of sites might be vastly different. Thus, a common viewing threshold might not be ideal for either type of site.

The same basic concept applies for user profiles. For instance, again using the example where the video file is a music video, assume here that the music video is by a particular artist/band. Those users with profiles that indicate that they are fans of the band might be grouped. Accordingly, the 'fans' group might be assigned a higher viewing threshold than other groups (e.g., those groups of users with profiles liking that same genre of music, or just music in general, etc.).

Thus, to begin the process, in step 102 data is acquired that can be used to ascertain the popularity of one or more portions of a video file(s). This type of data is also referred to herein as 'trending data' since it is indicative of what is popular or 'trending' in the viewer community. As described above, the goal here is to determine what portions or segments of a video file(s) are trending in the viewer community. Step 102 can be performed using data mining techniques performed on related social media sites. For instance, in step 102, data can be gathered from content providers. Content providers are generally those sites that provide the video file. An example of a content provider is YouTube. Users can visit the content provider site to view the video file. Content providers, such as YouTube, track the portions or segments of a video file that are viewed within a given time period. This video file tracking typically involves recording a start time and an end time to denote a particular segment of a video. Thus, as would be apparent to one of skill in the art, a particular segment of a video file might be identified as beginning one minute and ten seconds (1:10) into the video and ending two minutes and twenty seconds (2:20) seconds into the video. Content providers might maintain data related to how many views a particular segment of a video has received.

Further, content providers might also provide data further relating to which social groups viewed the particular segment, and how many times. Using the above example, the content provider might track how many views a segment of a music video by a particular band was viewed by users whose profiles indicate that they are fans of the band versus other users. This data related to different groups of the viewer community is preferably also collected in step 102. The notion here is that different social groups might have different viewing preferences and thus the popularity of the media might be reflected differently given the particular group.

Further, sites linking to or from the content on another site might also track viewing activity. For example, a site may provide a link to the video on the content provider's site. This site (also referred to herein as a linking site) may keep track—in the same manner as described above for the content provider—of how many views a particular segment (s) of the video file received from the tracking site's users. Additionally, in the same manner as described above, the linking site may maintain records further delineating which groups of users viewed each segment of the video file, and for how long. This information is preferably obtained in step 102.

In step 102, relevant trending data may also be obtained from social media sites, such as Facebook, related to certain areas (topics, people, etc.) of interest which can then be used to identify a popular segment(s) of the video file(s). For instance, trending data collected by a social media site, such as Facebook, might indicate that content related to a particular sports figure is popular. This type of trending data is preferably also obtained in step 102. Accordingly, any segments of a video containing the sports figure can be identified as being popular. This is an alternative process for determining the popular segments of a video file, in this case based on the popularity of certain content on other social media sites (rather than by frequency of views the actual segment itself received).

Any other relevant data related to the popularity (i.e., trending) of the video file might, in the same manner, be obtained in step 102. For instance, when viewing a video file, viewers might annotate certain segments of the file, or in some other manner indicate where the interesting content is. When posting a link to a video on YouTube, for example, a user might add to the link itself a timestamp as to where viewing of the video should begin. Presumably, this starts the video at a point that the user finds to be interesting.

Video files may also be annotated by users wherein the user highlights via labels or tags a video using, for example, exclamations or other types of social media vernacular. For instance, a user might indicate "Must See! at 10 minutes, 30 seconds," which indicates that the user found something of interest 10 minutes and 30 seconds into the video. Other commonly used exclamations or annotations can include "LOL," a thumbs-up, or any other indicia indicating that the user likes a particular content. This type of data is preferably collected as well in step 102. Furthermore, references to segments of a video file may also be made in a comment section which is set aside for viewers to share their opinions about a video with the general public. In such a section, a user may convey an emotional response to a video segment. Such a response may include a timestamp reference pointing to a segment of the video. For instance, a user might indicate "Must See @ 1:15" which directs others to a segment of the video starting at 1 minute and 15 seconds. By doing this, others may be more likely to review the video at the comment-directed segment of the video. Additionally, a user may also reference a segment of a video in comments by utilizing metadata tags. One example of a metadata tag is a hashtag, that is, a word or a phrase prefixed with the symbol #. This kind of metadata helps describe an item and allows it to be found again by browsing or searching. Thus, a user might indicate "Amazing #monkey!" whereby this type of metadata tag can reference a segment of a video. The metadata tag could also be searched against a segment of a video marked with the same tag, for example #monkey occurs at 2 minutes and 25 seconds. As will be described in detail below, in one exemplary embodiment, this type of trending data is used to fine-tune the video thumbnail selection. Namely, a further refinement of the most frequently viewed segments of the video can be made based on trending data which is used to find portions of the most frequently viewed segments that are popular among the viewers. This aspect will be described in further detail below.

While the description focuses generally on determining the popularity of segments of a given video file, this is done for ease and clarity of description, and it is expected that the above process is performed in parallel for multiple video files. Thus, trending data can be mined for a multitude of video files at the same time. Further, data collection (via step 102) can be performed on a regular basis. Namely, what is popular at one point in time might not be so an hour, day, month etc. later. Thus it is important to have up-to-date and current data at hand when evaluating popularity. Accordingly, in an exemplary embodiment, the data collection in step 102 is performed at regular intervals, such as once every hour, twice a day, twice a week, etc., which can vary depending on the subject matter at hand. For instance, topics of interest in pop culture, current events, sports, etc. may change rapidly and may benefit from more frequent data scans. By comparison, topics around which popularity trends change less frequently might center on events that occur over longer periods of time, such as elections which occur only once every four years, lunar occurrences, such as a full moon or lunar eclipse, etc. In those cases, trending data might not need to be collected as frequently to get an accurate representation of what content is popular among viewers.

In step 104, the trending data collected in step 102 is then analyzed to identify the segment(s) of a video file that are popular (trending) among the viewer community. As highlighted above, this assessment may be based on those segments of the video file that were most frequently viewed (e.g., viewed more than a threshold number of times) within a given time period. As also highlighted above, these popular segments of the video file may be identified using time stamping related to how far into the video file the given segment begins, and ends. Further, the above-described metadata and/or timestamp trending data can be analyzed in this step to determine popularity trends in different video content. For instance, the metadata tags (such as hashtags) that reference a segment of video can be collected and used in the same manner as the timestamp data to determine current areas of interest among viewers. Then, if any of that tagged (popular/trending) content appears in a video(s) in question, the thumbnails can be adapted (as described herein) to that content. A threshold may be set for tagging data purposes in the same manner as described herein for viewing thresholds. Basically, once a particular segment of a video file has been tagged by viewers more than a certain predetermined threshold number of times, then that segment can be considered to be popular or trending among the viewing community. The use of tagging and/or other indicators of popularity serves to further hone the selection process, and thereby increases the likelihood of presenting users with thumbnails of the video file that they find interesting.

The analysis performed in step 104 may simply focus on data acquired from users in general, i.e., the data collected in step 102 collectively relates to all users/viewers of the video file. In this case, the trending data collected in step 102 is analyzed to ascertain which segment(s) of the video file is/are popular among all viewers. Again, this analysis can focus simply on the most frequently viewed segments of the video.

Alternatively, the analysis performed in step 104 may also take into account the source of the trending data, for example, whether it pertains to certain social groups of users. This may impact setting the threshold value. See step 106, described below. Namely, as highlighted above, the frequency of views of a particular video file can vary depending on the content of the video, the viewer demographic, etc. One convenient way to account for these variable viewer preferences is by delineating the viewer data based on social group. As provided above, for example, users whose profiles indicate that they are fans of a particular band would be more likely to view that band's latest video (or portions thereof) more frequently than someone who is more generally a fan of that genre of music, or simply a fan of music in general. Thus, if one were simply to analyze data related to this band's video based on 'all users,' then the contribution by music fans in general might be dismissed when in fact the video is quite popular among this social group (even though their viewing frequency is significantly less then specific fans of the band). By taking social groupings into account, a more accurate prediction can be made as to what content is currently popular (trending).

In this exemplary embodiment, a gauge for popularity is which segments are viewed more than a threshold number of times (i.e., frequently viewed segments). Thus, in this case, in step 106, a viewing threshold or thresholds are set for the video file. Basically, as explained above, for a given video file, that/those segment/segments that is/are viewed more than the threshold number of times within a given time period are considered to be the most frequently viewed, i.e., popular or trending, segment(s). Thus, if the threshold is set at 500 views for the 24 hour period beginning at 12 AM on a given date, then (based on the data collected in step 102) only those segments receiving more than 500 views during that time period would be considered to be popular segments. In the basic scenario, one viewing threshold is set for the video file and the trending data (from step 102) will be analyzed (as per step 104) based on 'all users' i.e., all viewers of the video file to determine whether the threshold number of views has been met.

While ascertaining the most frequently viewed segments is helpful as an indicator of the popular content in a video file, it may also be desirable to have knowledge of which segments of the video file were the least viewed (i.e., viewed less than a threshold number of times within a certain period of time) and/or even which parts of the video file received an intermediate level/number of views (i.e., the balance of the most and least frequently viewed segments). It may be the case that for a given application, it is desirable to know the segments of a video file(s) that received the least number of views. For instance, by knowing which segments were viewed the least (and thus presumably less popular) and eliminating those from the selection process then, by a process of elimination, the remaining segments of the video file are popular. The selection process according to the present techniques could also be conducted in that manner. One might then alternatively, or in addition to, an upper viewing threshold set a lower threshold(s) as well.

When the most frequently viewed and least frequently viewed segments of a video file are known (based on respective viewing thresholds) then the amount of viewership that fall between the two extremes constitute intermediate viewership levels. It may be advantageous to have this type of data regarding the relative popularity of certain content. For instance, if video file segments (related to a topic A) consistently get a greater amount of views than video file segments (related to topic B), then one might choose to prioritize the segments of any video file which contain topic A over those which feature topic B (since topic A segments are relatively more popular than topic B segments). This provides one more useful piece of information to aid in making an intelligent selection of content.

As provided above, the threshold may vary depending on the viewership, i.e., so as to account for viewing preferences. The social group affiliation of the viewer, ascertained from the data collected in step 102, can be accounted for in setting the thresholds. As provided above, this variable threshold scenario can aid in obtaining a more accurate representation of viewer preferences, thus providing a better representation of what is currently popular.

The process for setting the threshold(s) is relatively straightforward. Namely, one skilled in the art can determine at what level to set the threshold(s) such that meaningful data is attained (i.e., setting the threshold too low will result in too many hits, while one that is too high will result in too few hits). The threshold(s) may also be adjusted depending on factors such as the content of the video file, the viewing audience, etc., the point here being that the threshold set does not have to be a static value—but one that can be varied on a file-by-file basis, over time, etc.

In the next phase of the process, the data collected and analyzed in steps 102-106 is then used to configure the video thumbnails provided to viewers of the video file such that the popular (trending) segments of the video file are accentuated. Namely, in step 108, the selection of video thumbnails for the video file are adapted to those popular (trending) segments identified in step 106. An example of adapting/configuring the video thumbnail selection is graphically depicted in FIGS. 2-4, described below.

According to an exemplary embodiment, the selection of video thumbnails (used to represent the video file) are reduced to the popular segments. Thus, by comparison with the above-described conventional process of representing a video file with a default selection of thumbnails, here an intelligent selection of video thumbnails is made based on what content in the video file is popular or trending. This will serve to peak viewer interest in the video file, thus potentially increasing viewership and/or increasing the time spent visiting the site, both of which are desirable results.

As described above, the trending data collected and analyzed as described above, may be used to further refine the thumbnail selection. For instance, trending data (collected in step 102—described above) such as user comments related to a particular portion(s) of the file (e.g., "Must See! at 10 minutes, 30 seconds") can be used to further limit the selection of the video segments for thumbnail representation. For instance, if a particular portion(s) of a most frequently viewed segment of the video file (see above) is tagged or otherwise highlighted by viewers, then the selection of the video thumbnails can be further limited to those highlighted portions of the video file (rather than the entire frequently viewed segment). The notion here is to present users with a sampling of the most interesting and relevant portions of the video file (via the thumbnail views). The assessment here is based on viewer feedback. Further, it is preferable to grasp the viewer's attention in the most direct way possible. Thus, if there are particularly popular portions of a video segment then it is important that the thumbnails capture that aspect. To further illustrate this concept, as shown, e.g., in FIGS. 3 and 4, described below, the present techniques serve to limit the thumbnail selection to those popular/frequently viewed segments of the video file. The particular portions of the popular segments that are captured in the video thumbnail can be based on the trending data related to what topics are currently "hot."

In step 110, users are presented with the selection of thumbnails from step 108. Users may select the thumbnails by mousing over the video file (see, for example, description of FIG. 3 below) and/or a cycle of video thumbnails can be presented to the user (without the need for a mouse over). Further, embodiments are provided herein where the thumbnails presented to viewers (the selection of which is performed based on the present techniques) are in some way prioritized, so as to indicate to a viewer which thumbnail(s) he/she might want to view first. The priority of the thumbnails can be based on the trending data (collected in step 102) related to what topics are currently "hot." Thus, if the trending data indicates that a particular band is currently popular, and segments of the video file contain that band, then the associated thumbnails can be accentuated in some manner to indicate to the viewer that they contain trending subject matter. By way of non-limiting example, the thumbnails can be prioritized by any one or more of size (e.g., a larger size equates with a higher priority), shape, color, orientation (e.g., thumbnails can be rotated side-ways to draw viewers' attention), ordering, etc. It is notable that the order of the thumbnails presented to users does not have to match the ordering of when it occurs in the video. So, as described above, if one segment of the video file is found to have more popular content than another, then the respective thumbnails can be prioritized accordingly even if the more popular segment occurs later in the video. This concept is further illustrated by the following example: say the most popular trend belongs to a thumbnail at 2:20, then that thumbnail is shown first to the user. The second in popularity is a portion of the video occurring at 1:03. So, in this example, when the user hovers over a preview of a video he/she sees the 1:03 video thumbnail after the 2:20 thumbnail. Further, according to the present techniques, when a user is presented with a video thumbnail correlating to the trending data, the user might also be shown text, markings, or some other suitable indicia to convey the corresponding trend to the user.

Figure 2:
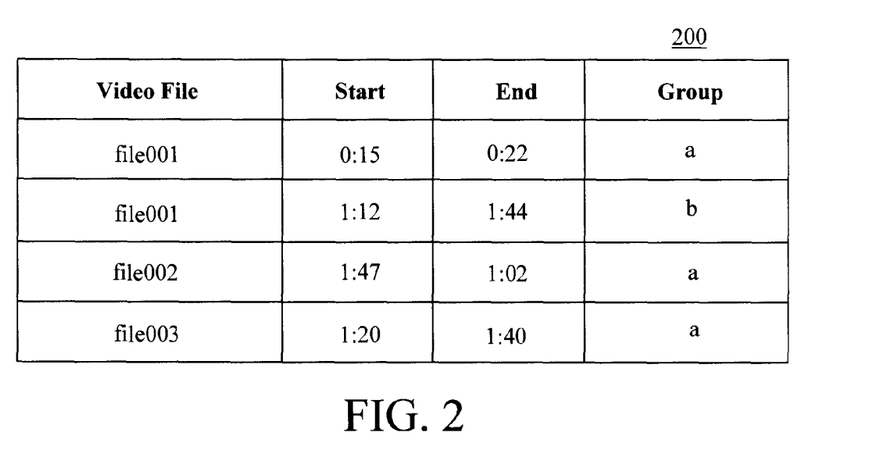
FIG. 2 is a diagram illustrating an exemplary table for tracking trending data for multiple video files according to an embodiment of the present invention.
Figure 3:
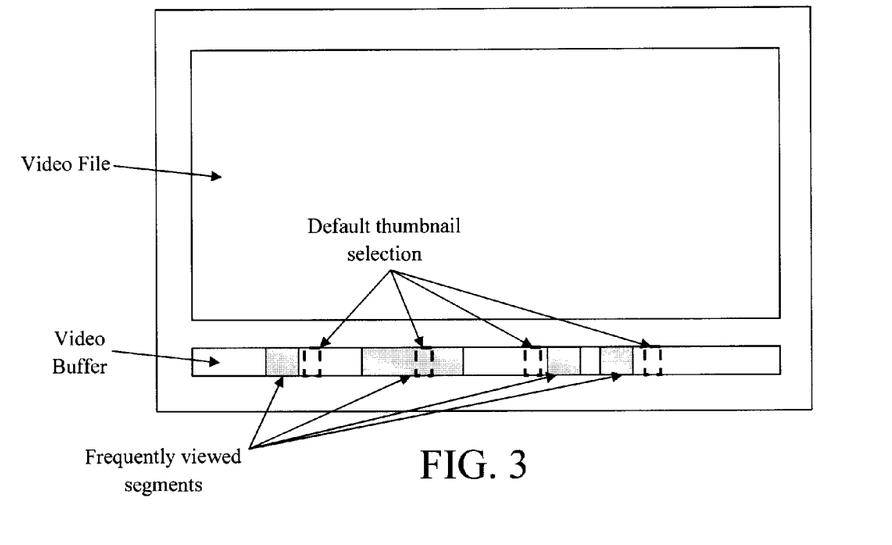
FIG. 3 is a diagram illustrating an exemplary video file, and buffer highlighting the frequently viewed segments of the video file according to an embodiment of the present invention.
Figure 4:
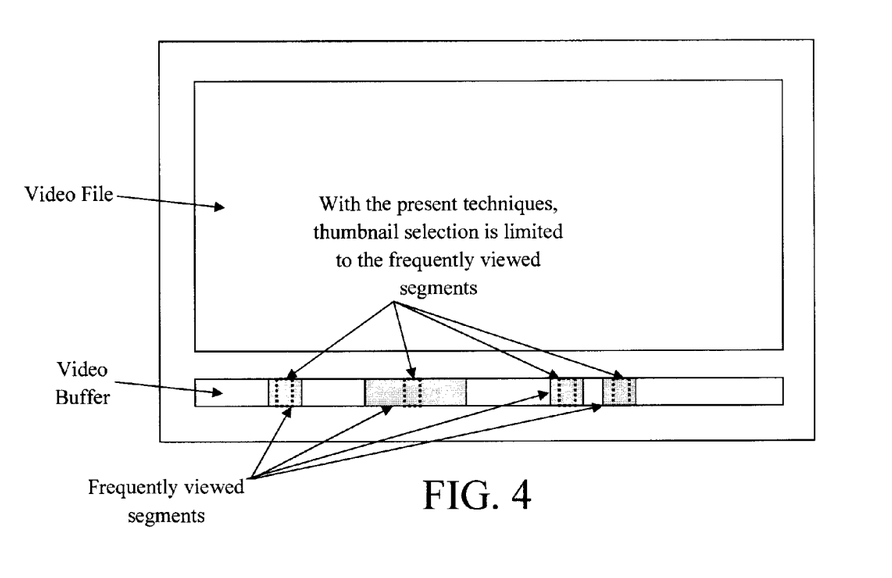
FIG. 4 is a diagram illustrating how, based on the present techniques, the thumbnail selection is limited to the frequently viewed segments of the video file according to an embodiment of the present invention.

An example implementing the above-described thumbnail selection process is now provided by way of reference to FIGS. 2-4. As provided above, the process begins by collecting trending data and using that data to identify the most frequently viewed segments of a video file(s). According to an exemplary embodiment, the segments (of the video file) may be tracked by determining portions viewed by 'all viewers' or by viewers of certain social groups. This concept was described in detail above.

An exemplary table 200 that may used to track viewership of multiple video files based on the trending data is shown in FIG. 2. The video files, i.e., file001, file002, etc. are listed in the first, left-hand column of table 200. The next two columns of table 200 record the start and end times, respectively of popular (trending) segments of the respective video file. As provided above, the times given reflect how far into the video file the segments begin, and end.

Finally, the last column of table 200 tracks the social group(s) to which the viewer(s) belong. Thus this example relates to the tracking viewership by certain social groups. Using the first two entries in the table as an example, the segment of video file001 from time point 0:15 to 0:22 was popular (e.g., viewed more than a threshold number of times within a given time period) among viewers of social group a, while a different segment of the same video file001 from time point 1:12 to 1:44 was popular among viewers of social group b. As provided above, the present techniques may be instead implemented to track the viewing preferences of all viewers as a whole, rather than tracking the preferences of different groups of viewers.

As described above, the next task is to adapt the video thumbnail selection to the popular (trending) segments of the video file. FIG. 3 schematically depicts a video file being displayed on a monitor and a video buffer wherein the frequently viewed segments of the video are highlighted. For illustrative purposes only, dashed boxes are included in FIG. 3 to indicate what default, auto-generated thumbnails of conventional schemes might look like. The point illustrated here is that without an intelligent selection process, the default thumbnails automatically generated can in many cases not coincide with any popular segments of the video file. By comparison, in accordance with the present techniques, the selection of thumbnails is limited to those popular segments of the video file. See FIG. 4. Thus, viewers will be presented with video thumbnails of the most popular/most frequently viewed segments of the video file by mousing over the file and/or a cycling of the thumbnails.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
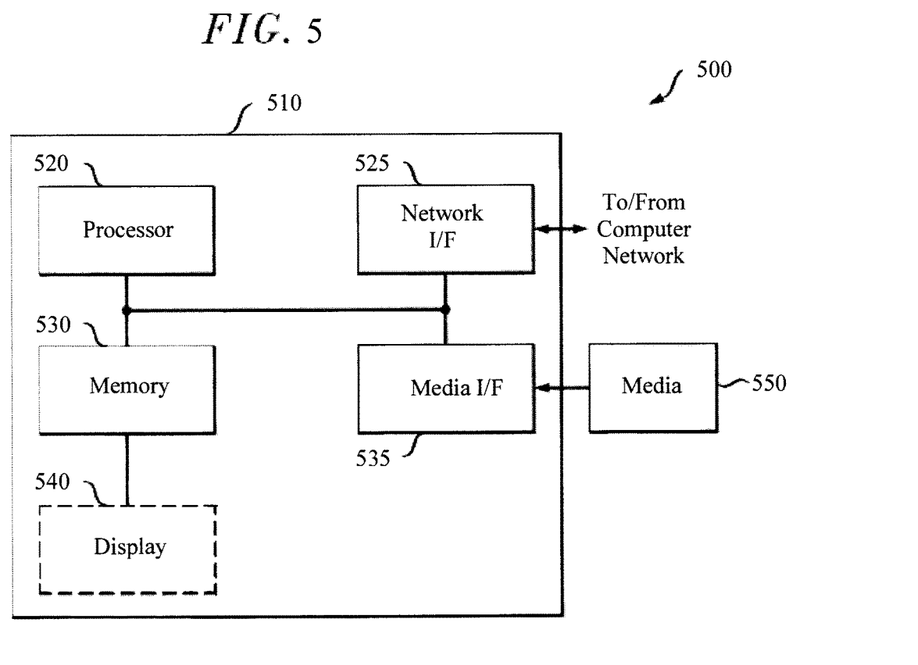
FIG. 5 is a diagram illustrating an exemplary apparatus for performing one or more of the methodologies presented herein according to an embodiment of the present invention.

Turning now to FIG. 5, a block diagram is shown of an apparatus 500 for implementing one or more of the methodologies presented herein. By way of example only, apparatus 500 can be configured to implement one or more of the steps of methodology 100 of FIG. 1 for selecting video thumbnails to represent a video file.

Apparatus 500 includes a computer system 510 and removable media 550. Computer system 510 includes a processor device 520, a network interface 525, a memory 530, a media interface 535 and an optional display 540. Network interface 525 allows computer system 510 to connect to a network, while media interface 535 allows computer system 510 to interact with media, such as a hard drive or removable media 550.

Processor device 520 can be configured to implement the methods, steps, and functions disclosed herein. The memory 530 could be distributed or local and the processor device 520 could be distributed or singular. The memory 530 could be implemented as an electrical, magnetic or optical memory, or any combination of these or other types of storage devices. Moreover, the term "memory" should be construed broadly enough to encompass any information able to be read from, or written to, an address in the addressable space accessed by processor device 520. With this definition, information on a network, accessible through network interface 525, is still within memory 530 because the processor device 520 can retrieve the information from the network. It should be noted that each distributed processor that makes up processor device 520 generally contains its own addressable memory space. It should also be noted that some or all of computer system 510 can be incorporated into an application-specific or general-use integrated circuit.

Optional display 540 is any type of display suitable for interacting with a human user of apparatus 500. Generally, display 540 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method of selecting video thumbnails used to represent a video file, the method comprising the steps of:
   (a) acquiring trending data from one or more content providers of the video file, wherein the trending data specifies a frequency with which segments of the video file were viewed by viewers, and wherein the trending data acquired further comprises annotations of the video file by viewers that reference the segments of the video file and which are obtained from social media sites;
   (b) using the trending data and a viewing frequency threshold to identify one or more of the segments of the video file that are popular among the viewers; and
   (c) adapting a selection of the video thumbnails used to represent the video file to the segments identified in step (b) that are popular among the viewers, and refining the selection of the video thumbnails to select portions of the segments of the video file referenced by the annotations.

2. The method of claim 1, wherein the segments of the video file that are popular among viewers comprise one or more most frequently viewed segments of the video file which are segments of the video file that are viewed more than a threshold number of times during a same given time period.

3. The method of claim 1, wherein the content providers track the trending data, wherein linking sites which provide a link to the video file also track the trending data, and wherein viewing activity from the linking sites is included in the trending data.

4. The method of claim 2, wherein the trending data is used to identify the most frequently viewed segments for one or more groups of users.

5. The method of claim 2, further comprising the step of: adjusting the threshold number of times within the given time period to be different for different groups of the viewers to account for differences in viewing preferences, wherein the groups are based on social media affiliations of the viewers, and wherein the differences in viewing preferences comprise differences in a frequency with which the viewers belonging to different groups view the video file.

6. The method of claim 1, further comprising the step of: using the trending data to identify one or more least frequently viewed segments of the video file by setting a lower viewing threshold whereby the least frequently viewed segments of the video file comprise segments of the video file that are viewed less than the lower viewing threshold number of times during a same given time period.

7. The method of claim 1, further comprising the step of: reducing the selection of the video thumbnails used to represent the video file to only the segments identified in step (b).

8. The method of claim 1, further comprising the step of: presenting a set of video thumbnails to a user based on the selection of the video thumbnails from step (c).

9. The method of claim 8, further comprising the step of: prioritizing the video thumbnails presented to the user based on the trending data.

10. The method of claim 9, wherein the video thumbnails are prioritized based on one or more of a size, shape, color, and orientation of the video thumbnails.

11. An apparatus for selecting video thumbnails used to represent a video file, the apparatus comprising:
    a memory having computer readable instructions thereon; and
    at least one processor device, coupled to the memory, which is caused by the computer readable instructions to:
    (a) acquire trending data from one or more content providers of the video file, wherein the trending data specifies a frequency with which segments of the video file were viewed by viewers, and wherein the trending data acquired further comprises annotations of the video file by viewers that reference the segments of the video file and which are obtained from social media sites;
    (b) use the trending data and a viewing frequency threshold to identify one or more of the segments of the video file that are popular among the viewers; and
    (c) adapt a selection of the video thumbnails used to represent the video file to the segments identified in step (b) that are popular among the viewers, and refine the selection of the video thumbnails to select portions of the segments of the video file referenced by the annotations.

12. The apparatus of claim 11, wherein the segments of the video file that are popular among viewers comprise one or more frequently viewed segments of the video file which are segments of the video file that are viewed more than a threshold number of times during a same given time period.

13. The apparatus of claim 12, wherein the computer readable instruction further cause the at least one processor device to:
    adjust the threshold number of times within the given time period to be different for different groups of the viewers to account for differences in viewing preferences, wherein the groups are based on social media affiliations of the viewers, and wherein the differences in viewing preferences comprise differences in a frequency with which the viewers belonging to different groups view the video file.

14. The apparatus of claim 11, wherein the computer readable instruction further cause the at least one processor device to:
   reduce the selection of the video thumbnails used to represent the video file to only the segments identified in step (b).

15. The apparatus of claim 11, wherein the computer readable instruction further cause the at least one processor to:
   present a set of video thumbnails to a user based on the selection of the video thumbnails from step (c).

16. The apparatus of claim 15, wherein the computer readable instruction further cause the at least one processor device to:
   prioritize the video thumbnails presented to the user based on the trending data.

17. A computer program product for selecting video thumbnails used to represent a video file, the computer program product comprising a non-transitory computer readable storage medium having program instructions embodied therewith, the program instructions executable by a computer to cause the computer to:
   (a) acquire trending data from one or more content providers of the video file, wherein the trending data specifies a frequency with which segments of the video file were viewed by viewers, and wherein the trending data acquired further comprises annotations of the video file by viewers that reference the segments of the video file and which are obtained from social media sites;
   (b) use the trending data and a viewing frequency threshold to identify one or more of the segments of the video file that are popular among the viewers; and
   (c) adapt a selection of the video thumbnails used to represent the video file to the segments identified in step (b) that are popular among the viewers, and refine the selection of the video thumbnails to select portions of the segments of the video file referenced by the annotations.

18. The computer program product of claim 17, wherein the segments of the video file that are popular among viewers comprise one or more frequently viewed segments of the video file which are segments of the video file that are viewed more than a threshold number of times during a same given time period.

19. The computer program product of claim 17, wherein the program instructions further cause the computer to:
   reduce the selection of the video thumbnails used to represent the video file to only the segments identified in step (b).

20. The computer program product of claim 17, wherein the program instructions further cause the computer to:
   present a set of video thumbnails to a user based on the selection of the video thumbnails from step (c).

* * * * *